United States Patent [19]

Hansen et al.

[11] Patent Number: 4,638,867
[45] Date of Patent: Jan. 27, 1987

[54] TINE HOLDER FOR TURF AERATING APPARATUS

[75] Inventors: Loren F. Hansen; Mark E. Lamb, both of Lincoln, Nebr.

[73] Assignee: Outboard Marine Corporation, Waukegan, Ill.

[21] Appl. No.: 691,847

[22] Filed: Jan. 16, 1985

[51] Int. Cl.[4] .................. A01B 45/02; B60B 27/06
[52] U.S. Cl. ..................... 172/22; 172/751; 403/371
[58] Field of Search ............ 172/22, 21, 763, 751, 172/749; 403/371, 370, 374

[56] References Cited

U.S. PATENT DOCUMENTS

| Re. 30,705 | 11/1981 | Hines . | |
|---|---|---|---|
| 943,989 | 12/1909 | Nacke . | |
| 1,965,177 | 7/1934 | Finkl . | |
| 1,978,659 | 10/1934 | Whittaker . | |
| 2,140,266 | 12/1938 | Leeberg | 294/50.7 |
| 2,910,127 | 10/1959 | Saunders . | |
| 3,148,737 | 9/1964 | Lunsford . | |
| 3,429,378 | 2/1969 | Mascaro | 172/22 |
| 3,881,553 | 5/1975 | Angeski . | |
| 4,134,700 | 1/1979 | Nelson | 403/371 |

FOREIGN PATENT DOCUMENTS

| 143451 | 9/1951 | Australia | 172/22 |
|---|---|---|---|
| 482342 | 1/1975 | Australia | 172/22 |

Primary Examiner—Richard J. Johnson
Attorney, Agent, or Firm—John T. Synnestvedt; Richard D. Weber

[57] ABSTRACT

A tine holder for turf aerating equipment includes a horizontal tine arm having a plurality of spaced apertures therein corresponding to mounting positions of the coring tines. The hollow tines are outwardly tapered at their upper ends and the apertures in the tine arm are of a diameter equal to the inner diameter of the upper ends of the tines. A tine holding bar disposed beneath the tine arm is provided with tapered apertures aligned with the apertures in the tine arm. The taper of the bar apertures corresponds to the taper of the tine upper end and permits the seating of the coring tines in the apertures with a small portion of each tine extending thereabove. A plurality of bolts passing through aligned bolt holes in the tine arm and tine holding bar permit a clamping of the tines against the tine arm in alignment with the tine arm apertures.

9 Claims, 3 Drawing Figures

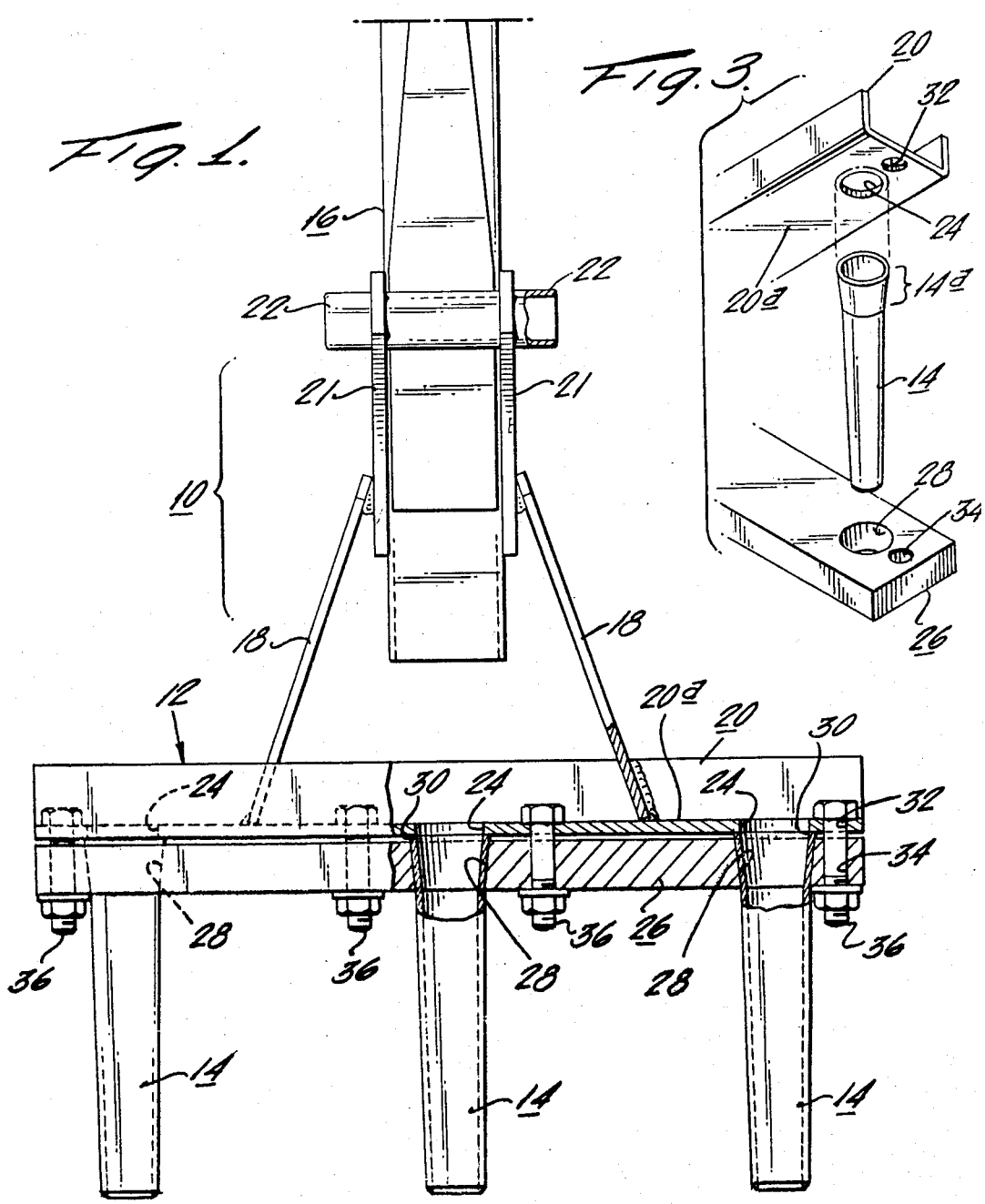

TINE HOLDER FOR TURF AERATING APPARATUS

BACKGROUND OF THE INVENTION

The present invention relates generally to turf aerating equipment and relates more particularly to an arrangement for securing hollow turf coring tines to a tine actuating member.

A variety of turf aerating devices have been developed for forming slots or holes in turf to permit the penetration of air, water and nutrients to the grass roots. The type of device which forms holes in the turf commonly utilizes a hollow coring tine as the turf penetrating element. Such tines usually are annular in section and slightly tapered, being larger at their upper ends, to facilitate the discharge of the turf cores therethrough. The mechanism for driving the tines into the ground conventionally provides a reciprocating motion to a group of tines and a given machine normally includes several groups of tines which are driven sequentially into the ground to provide a repeating turf aerating pattern.

Since the tines may strike stones or other impenetrable hard objects hidden within or beneath the turf, they are subject to breakage or deformation. The tines also wear out after an extended period of use. Their manner of attachment must accordingly permit tine replacement when necessary, and should further provide sufficient mounting security to prevent loss of the tines under severe service conditions.

Various arrangements have heretofore been employed for the attachment of turf aerating tines. In one conventional arrangement, the tine upper end is held within a split clamp on the tine carrying member. In another type of attachment, a split collet with external tapered threads is utilized to grip the upper end of the tine. In both of these arrangements, the tines are held in position by a frictional gripping of the substantially cylindrical upper ends of the tines.

Although such tine holding arrangements permit the ready replacement of a tine should it become damaged or unduly worn, they are subject to occasional tine loss due to the loosening of the friction type of clamping mechanism. Such tine loss not only deprives the aerator of its full aerating function, but by leaving metal tines partially protruding from the ground, presents a serious hazard to lawn mowing equipment and especially reel type mowers. It is accordingly important that a tine supporting arrangement be effective in preventing tine loss while still permitting the removal and replacement of individual tines without undue time and effort.

Other tine securing arrangements have been proposed wherein the tines themselves are threaded and/or flanged. Although such tine structures are less prone to tine loss, their use has been limited because of their substantially increased cost.

BRIEF SUMMARY OF THE INVENTION

In the present tine holding arrangement, the upper ends of the tines are outwardly tapered and the tapered tine ends are seated within spaced, tapered apertures of a horizontally disposed tine holding bar with a small portion of each tine extending above the bar. The tine holding bar with the tines seated therein is secured to the tine driving means, such as a tine arm, by screws which clamp the tines in positively held relation against the tine arm. Apertures in the tine arm having a diameter substantially equal to the inner diameter of the tines at the upper ends thereof are aligned with the tines and permit passage of the turf cores there-through.

It is accordingly a first object of the present invention to provide a tine holder for turf aerating tines which positively secures the tines to the tine driving mechanism to effectively prevent tine loss.

Another object of the invention is to provide a tine holder as described which may be quickly and easily disassembled to permit removal and replacement of individual tines.

A further object of the invention is to provide a tine holder as described of an economical construction which is adapted to use with various types of tine driving mechanisms.

Additional objects and advantages of the invention will be more readily apparent from the following detailed description of an embodiment thereof when considered together with the accompanying drawings.

BRIEF DESCRIPTION OF THE DRAWINGS

FIG. 1 is a side elevational view of a turf aerating mechanism in accordance with the present invention with portions thereof broken away and in section;

FIG. 2 is a top plan view of the turf aerating mechanism shown in FIG. 1; and

FIG. 3 is an exploded perspective view of a portion of the assembly shown in FIGS. 1 and 2.

DESCRIPTION OF THE PREFERRED EMBODIMENT

Referring to the drawings and particularly FIG. 1 thereof, a turf aerating mechanism generally designated 10 in accordance with the present invention includes a tine holder assembly 12 from which extends a plurality of spaced downwardly directed hollow coring tines 14. The tine holder assembly 12 is mounted beneath a substantially vertical tubular column 16 by a pair of diagonal brackets 18 which connect the lower end of the column to a horizontal tine arm 20 of the tine holder assembly. As most clearly shown in FIG. 3, the tine arm 20 comprises a channel shaped member having the free edges thereof directed upwardly. The upper end (not shown) of the vertical column 16 is connected to a reciprocating drive mechanism which imparts an essentially vertical driving motion to the column 16 to drive the tines 14 into the turf in a reciprocating fashion. Lugs 22 extending from plates 21 on each side of the column 16 permit connection of the tine holder assembly to a tine arm return mechanism (not shown) which returns the assembly to its starting position between ground engaging strokes.

The invention pertains to the manner of attachment of the coring tines 14 to the tine support means, namely, the tine arm 20. The tines 14 comprise tubular members of annular cross section, which are slightly tapered along their length so as to be larger at their upper attached ends than at their lower free ends to facilitate passage of the turf cores therethrough. In addition to this conventional taper, the tines 14 in accordance with the invention are tapered outwardly adjacent their upper ends in the region 14a, the opposed walls of the tapered end portion preferably being inclined at an included angle of approximately 10°.

A plurality of spaced circular apertures 24 in the downwardly facing portion 20a of the tine arm 20 are located at points corresponding to the desired positions of the tines 14. The diameter of the apertures 24 is substantially equal to the inner diameter of the upper ends of the tines.

A tine holding bar 26 disposed beneath and in spaced parallel relation to the tine arm 20 includes a plurality of spaced tapered apertures 28 aligned with the tine arm apertures 24. The tine holding bar apertures 28 are tapered at the same angle as that of the tapered end region 14a of the tines, and the size of the apertures 28 is such as to permit a seating of the tine tapered end portions therewithin. The length of the tine tapered end portion is sufficient to provide a small protrusion 30 of the upper end of each tine above the tine holding bar when the tines are seated within the apertures 28 as illustrated in FIG. 1. A plurality of aligned bolt holes 32 and 34 respectively in the tine arm and tine holding bar receive bolts 36, the tightening of which serves to clamp the upper ends of the tines securely against the lower surface of the tine arm 20.

For use of the tine holder assembly, the tines 14 are seated in the apertures 28 of the tine holding bar 26 and the bar is then attached to the tine arm 20 by means of the bolts 36. The bolts serve to clamp the upper ends of the tines against the lower surface 20a of the tine bar 20 in alignment with the tine bar apertures 24, thus permitting the unobstructed passage of the turf cores upwardly through the tines and the apertures 24 when the tines are reciprocated into the ground. Because of the cooperation of the tapered end portions 14a of the tines and the apertures 28 of the tine holding bar, the tines are positively held in position and cannot become loosened or separated from the assembly.

In the event that one or more of the tines requires replacement, the tine holding bar 26, along with the tines seated therein, is removed from the tine bar by removal of the bolts 36. The tine or tines requiring replacement may then be quickly removed and the substitute tine or tines put in their place. The tine holding bar and mounted tines are then reattached to the tine arm by means of the bolts 36.

Manifestly, changes in details of construction can be effected by those skilled in the art without departing from the invention.

We claim:

1. A mounting arrangement for securing one end of a hollow turf aerating tine to a tine supporting member, said mounting arrangement comprising an outwardly tapered portion of said tine at the secured end thereof tapered to provide a maximum tine width at said tine end, an aperture in said tine supporting member, a tine holding bar disposed in spaced relation to said tine supporting member, a tapered aperture in said tine holding bar having substantially the same taper as said tapered tine end portion for cooperatively receiving said tine end portion, the end of said tapered tine end portion protruding beyond said bar into engagment with said tine supporting member upon seating of said end portion in said aperture, and demountable attachment means for biasing said tine holding bar toward said tine supporting member and thereby clamping said protruding tine end against said tine supporting member in alignment with said aperture, said tine being additionally tapered from its tapered end portion to its free end with the smallest diameter thereof being at its free end, said additional taper being a more gradual taper than said end portion taper.

2. The invention as claimed in claim 1 wherein said aperture in said tine supporting member comprises a round hole having a diameter substantially equal to the inner diameter of the adjacent tapered end of the tine.

3. The invention as claimed in claim 1 wherein said demountable attachment means comprises a plurality of bolts extending through aligned bolt holes in said tine supporting member and said tine holding bar.

4. An aerator tine holder assembly comprising a tine arm having spaced apertures therein, a tine holding bar disposed in spaced parallel relation to said tine arm, a plurality of apertures in said tine holding bar aligned with the apertures of said tine arm, a plurality of hollow coring tines, each said coring tine having an end portion outwardly tapered to provide a maximum tine width at said tine ends, said tine holding bar apertures being tapered at substantially the same angle as said tine tapered end portions to receive the tine tapered end portions in seated relation, the tapered end portions of said tines protruding beyond said tine holding bar and engaging said tine arm in alignment with said tine arm apertures upon seating of said end portions in said apertures, said tine arm apertures having substantially the same diameter as the inner diameter of the outer ends of said tine tapered end portions, and demountable attachment means for biasing said tine holding bar toward said tine arm and thereby clamping said protruding tine ends thereagainst, each said tine being additionally tapered from the tapered end portion to its free end with the smallest diameter occurring at the free end thereof, said additional taper being a more gradual taper than said end portion taper.

5. The invention as claimed in claim 4 wherein said demountable attachment means comprises a plurality of bolts extending through aligned bolt holes in said tine arm and said tine holding bar.

6. The invention as claimed in claim 5 wherein at least one of said bolts is located closely adjacent each of said coring tines.

7. The invention as claimed in claim 4 wherein said tine tapered end portion walls form an included angle of 10°.

8. An aerator tine holder assembly comprising an elongated tine arm adapted for horizontal mounting on a turf aerator for vertical reciprocation thereby, a plurality of spaced circular apertures extending through a downwardly facing portion of said tine arm, a tine holding bar disposed in spaced parallel relation to said tine arm beneath said tine arm apertures, a plurality of apertures in said tine holding bar aligned with the apertures of said tine arm, a plurality of hollow coring tines, each said coring tine having an outwardly tapered upper end portion providing a maximum tine width at said tine upper ends, said tine holding bar apertures being tapered at substantially the same angle as said tine tapered end portions, each said tine holding bar aperature receiving one of said tines with the tapered end portion thereof being seated in the tapered tine holding bar aperture, the flared tapered ends of said tines protruding slightly above siad tine holding bar and engaging said tine arm, said tine arm apertures having substantially the same diameter as the inner diameter of the upper ends of said tines, a plurality of aligned bolt holes extending through the tine arm and tine holding bar, and a plurality of bolts extending through said bolt holes, said bolts serving to bias said tine holding bar toward said tine arm to thereby clamp the protruding upper ends of said tines against the lower surface of said tine arm in alignment with said tine arm apertures whereby turf cores passing upwardly through said hollow coring tines may pass in an unobstruted fashion through said tine arm apertures, each said tine being additionally tapered from the tapered upper end portion thereof to its lower end, the smallest diameter to each said tine occurring at the lower end thereof, said additional taper being a more gradual taper than said end portion taper.

9. The invention as claimed in claim 8 wherein at least one said bolt is located closely adjacent each said coring tine.

* * * * *